United States Patent
Marocchini

(10) Patent No.: US 9,057,455 B2
(45) Date of Patent: Jun. 16, 2015

(54) CRANK

(75) Inventor: Francis P. Marocchini, Somers, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 279 days.

(21) Appl. No.: 13/354,770

(22) Filed: Jan. 20, 2012

(65) Prior Publication Data

US 2013/0187071 A1 Jul. 25, 2013

(51) Int. Cl.
*F16K 31/52* (2006.01)

(52) U.S. Cl.
CPC ......... *F16K 31/521* (2013.01); *Y10T 74/18208* (2015.01); *Y10T 29/49405* (2015.01); *Y10T 74/2173* (2015.01)

(58) Field of Classification Search
USPC ............ 251/279, 280, 62; 29/890.12; 74/595, 74/44
See application file for complete search history.

(56) References Cited

U.S. PATENT DOCUMENTS

| | | | |
|---|---|---|---|
| 3,317,179 A * | 5/1967 | Willis | 251/58 |
| 3,554,482 A | 1/1971 | Dunkin | |
| 4,017,655 A | 4/1977 | Mutschler | |
| 4,180,243 A * | 12/1979 | Hsu et al. | 251/234 |
| 4,251,049 A * | 2/1981 | Muehl | 251/58 |
| 4,285,499 A | 8/1981 | Zukausky | |
| 4,430,043 A * | 2/1984 | Knight et al. | 415/159 |
| 4,479,678 A | 10/1984 | Sharp | |
| 4,507,050 A | 3/1985 | Jeffery et al. | |
| 4,715,779 A | 12/1987 | Suciu | |
| 5,899,058 A * | 5/1999 | Narcus et al. | 60/226.3 |
| 6,386,511 B1 * | 5/2002 | Watanabe et al. | 251/301 |
| 6,543,747 B2 * | 4/2003 | Buchwald et al. | 251/279 |
| 6,742,324 B2 * | 6/2004 | Bachelder et al. | 60/204 |
| 7,581,382 B2 | 9/2009 | Sadil et al. | |
| 7,731,152 B2 * | 6/2010 | Abel et al. | 251/63.5 |
| 7,850,419 B2 * | 12/2010 | Vrljes et al. | 415/145 |
| 7,854,124 B2 * | 12/2010 | Sadil et al. | 60/771 |
| 8,015,996 B2 | 9/2011 | Sadil et al. | |
| 8,668,444 B2 | 3/2014 | Jarrett, Jr. et al. | |
| 2005/0218162 A1 | 10/2005 | Healy et al. | |
| 2009/0235885 A1 | 9/2009 | Hara et al. | |
| 2009/0261615 A1 * | 10/2009 | Purcell | 296/108 |
| 2011/0072929 A1 * | 3/2011 | Feng | 74/479.01 |

* cited by examiner

*Primary Examiner* — John Bastianelli
*Assistant Examiner* — Andrew J Rost
(74) *Attorney, Agent, or Firm* — Kinney & Lange, P.A.

(57) ABSTRACT

A crank for a valve linkage system includes a pin sleeve having a bore for receiving a connecting pin to connect the crank to a link; a shaft sleeve having a bore for receiving a shaft; an arm between the pin bore and shaft sleeve; and a first stiffening rib extending from the shaft sleeve toward the pin bore.

18 Claims, 3 Drawing Sheets

CRANK

BACKGROUND

The present invention relates to pneumatic air valves. In particular, the invention relates to actuator assemblies for pneumatic air valves.

Pneumatic air valves, sometimes called butterfly valves, in gas turbine engines typically include linkage systems. The actuator portion of the pneumatic air valve is cantilevered off the valve body to maintain a light-weight and simple construction. A linkage system is used to translate axial motion in the piston into a rotation of a disk to open or close the valve.

Linkage systems in pneumatic air valves typically include two primary parts: a crank and a link. The crank and link are pinned together with a close-fit metallic pin. The crank can resemble a tuning fork like structure with a sleeve and two extending arms to connect above and below a link.

SUMMARY

A crank for a valve linkage system includes a pin sleeve having a bore for receiving a connecting pin to connect the crank to a link; a shaft sleeve having a bore for receiving a shaft; an arm between the pin bore and shaft sleeve; and a first stiffening rib extending from the shaft sleeve toward the pin bore.

DETAILED DESCRIPTION

Figure 1A:
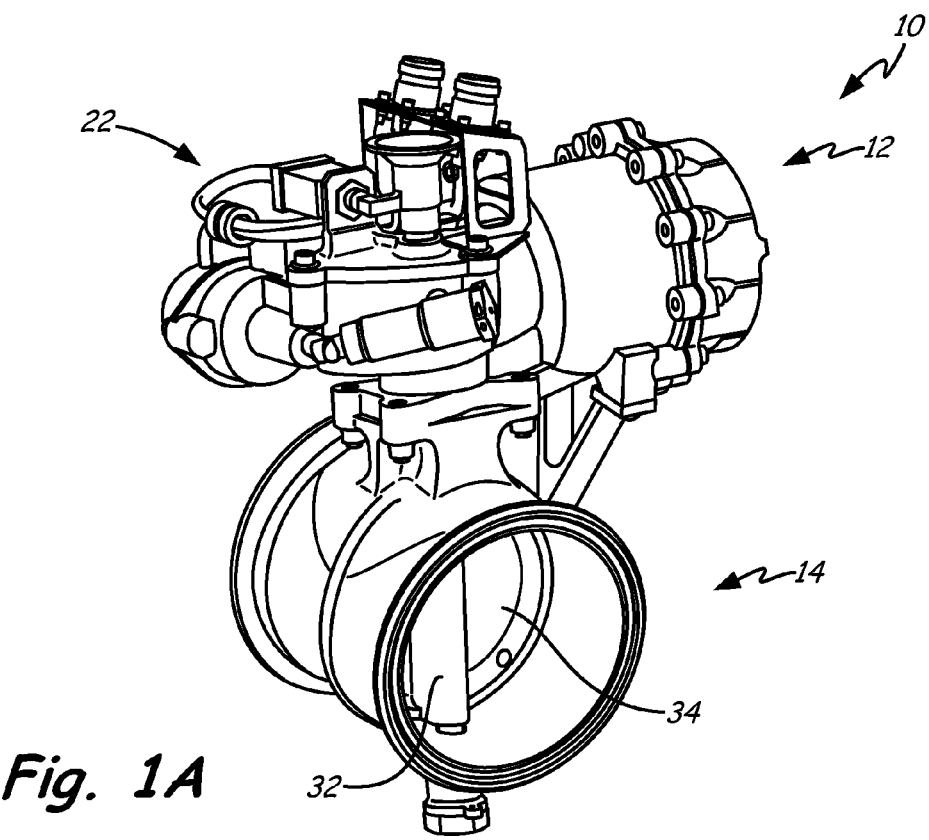
FIG. 1A is perspective view of a pneumatic air valve.
Figure 1B:
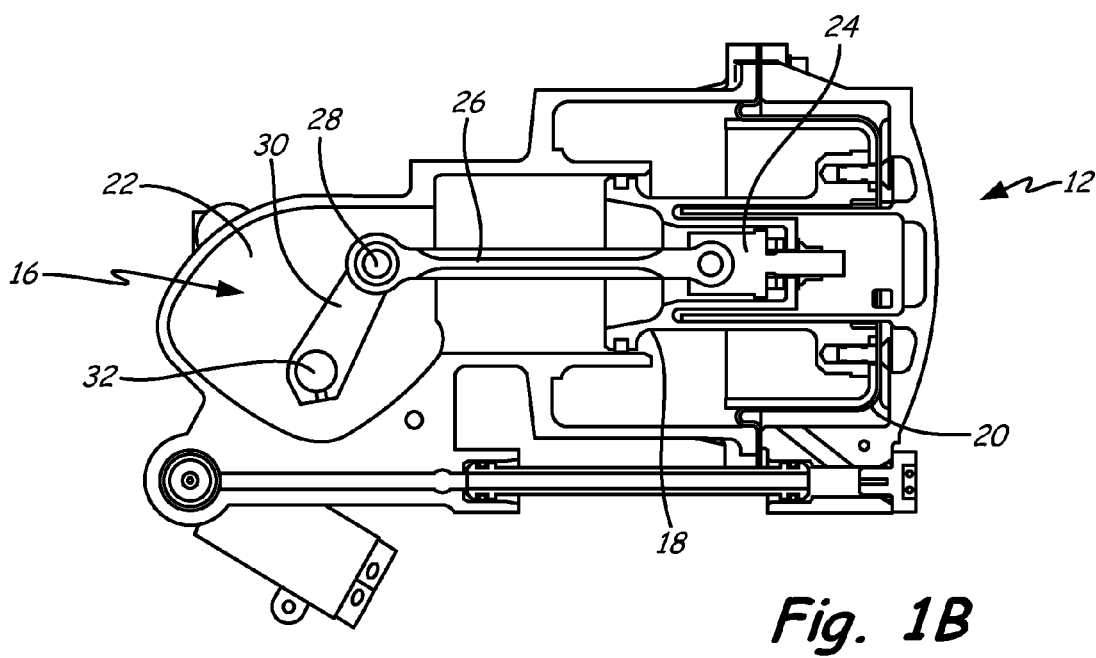
FIG. 1B is a cross-sectional view of FIG. 1A.

FIGS. 1A and 1B illustrate a pneumatic air valve incorporating the present invention. Pneumatic air valve 10 includes actuator assembly 12 and valve 14. Actuator assembly 12 includes linkage system 16, small piston 18, large piston 20 and actuator housing 22. Linkage system 16 includes clevis 24, link 26, bolt 28, crank 30 and shaft 32. Valve 14 includes disk 34.

Small piston 18 and large piston 20 connect to link 26 through clevis 24. Link 26 connects to crank 30 through bolt 28. Crank 30 connects to shaft 32, and shaft 32 connects to disk 34 of valve 14.

Small piston 18 and large piston 20 move laterally based on a motor (not shown) controlling air in cylinders containing pistons 18, 20. Clevis 24 translates that movement to lateral movement of link 26. The movement of link 26 causes crank 30 to rotate, which causes shaft 32 to rotate. The rotation of shaft 32 causes disk 34 of valve 14 to open or close.

Figure 2A:
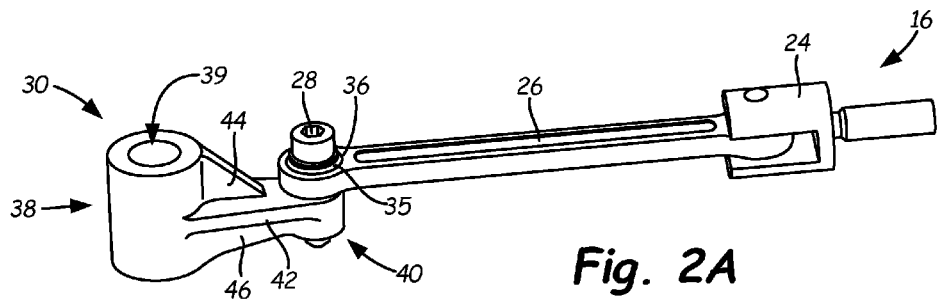
FIG. 2A is a perspective view of a linkage system.
Figure 2B:
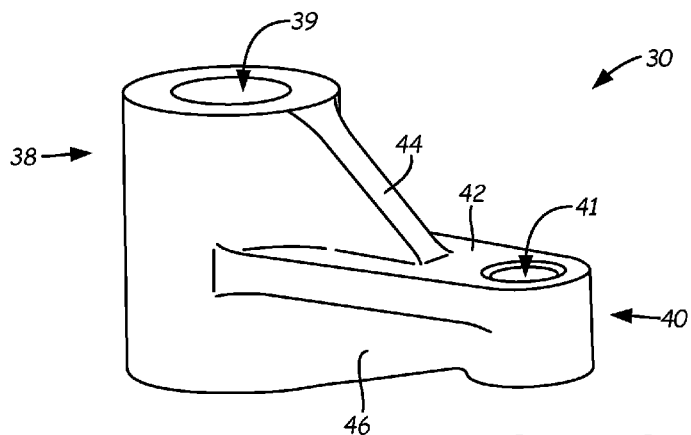
FIG. 2B is a perspective view of a crank in the linkage system of FIG. 2A.
Figure 2C:
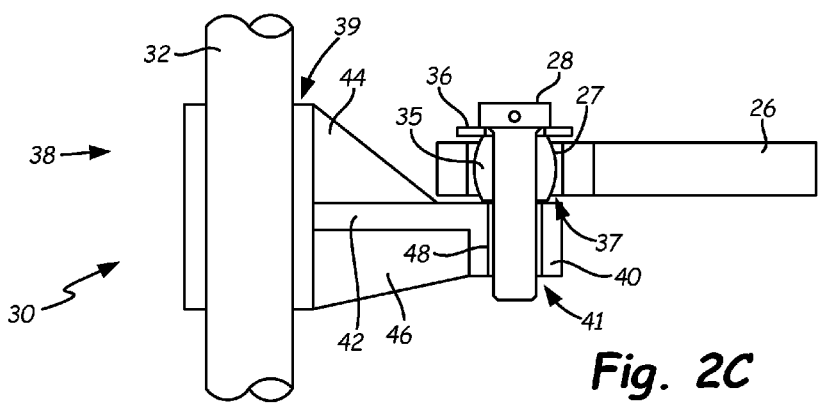
FIG. 2C is a cross-sectional view of the crank of FIG. 2B and connections to the linkage system of FIG. 2A

FIG. 2A is a perspective view of linkage system 16. FIG. 2B is a perspective view of crank 30 in linkage system 16, and FIG. 2C is a cross-sectional view of crank 30 and connections to linkage system 16. FIGS. 2A-2C include linkage system 16 with clevis 24, link 26, bolt 28, crank 30, shaft 32, spherical bushing 35 and washer 36. Link 26 includes pin bore 37. While bushing 34 is shown as a spherical bushing, it could be other types of bushing depending on system requirements.

Crank 30 includes shaft sleeve 38 with bore 39, pin sleeve 40 with pin bore 41, arm 42, first stiffening rib 44 and second stiffening rib 46. Pin bore 41 can be a threaded bore to receive bolt 28. Crank 30 is generally one part, made of steel, aluminum, plastic or any other material suitable for the situation. Crank 30 can be made by machining, molding, casting or other methods.

As mentioned above, to maintain a light weight system, actuator assembly 12 of pneumatic air valve 10 is cantilevered off the valve body and connected by linkage system 16. This arrangement makes actuator assembly 12 susceptible to vibrations. Vibrations from valve 14 can be amplified within actuator assembly 12, causing galling in connections, especially at pin bore 41.

Past cranks resembled a "tuning fork" or clevis configuration with two arms extending from a shaft sleeve with two separate pin bores on the ends of the arms. A link with a pin bore would connect between the arms, with a pin inserted to hold the crank and link together. The "tuning fork" configuration has a low natural frequency which can excite in a vibration environment. The vibrations in actuator assemblies were amplified in the low frequency "tuning fork" cranks, resulting in wear on the connection between the link and crank.

Adding stiffening ribs 44, 46 increases the natural frequency of crank 30, resulting in a more vibration tolerant crank 30 and overall linkage system 16. Ribs 44, 46 make crank 30 more rigid. This increase in natural frequency and rigidity of crank 30 through the design of a single link 26 connection through pin bore 41 with arm 42 and ribs 44, 46 makes crank 30 less susceptible to vibrations and vibration amplification from valve body. This results in lower stress in crank 30 and less wear and galling in linkage system 16.

Crank 30 can be connected to linkage system 16 with an integral locking insert 48. Integral locking insert 48 can be a helical wire insert into pin bore 41 in crank 30, with a part of the insert having a deformed thread. Integral locking insert 48 can act as a secondary means of retaining bolt 28 (primary retention means is torqueing bolt 28 into threaded pin bore 41) and making it very difficult to turn bolt 28 after it has run through the portion with the deformed thread.

Figure 3:
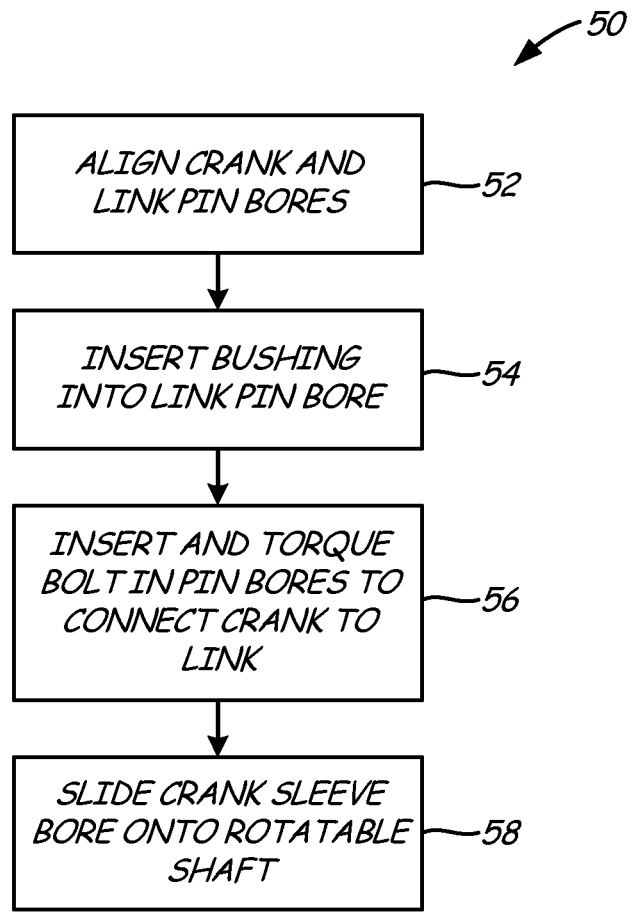
FIG. 3 shows a block diagram of a method for installing a crank into a pneumatic air valve.

FIG. 3 shows a block diagram of method 50 for inserting crank 30 into linkage system 16 of pneumatic air valve 10. Method 50 includes steps of aligning crank pin bore 41 with bore 37 in link 26 (step 52), inserting bushing 35 into link pin bore 37 (step 54); inserting and torqueing bolt 28 to connect crank 30 to link 26 (step 56); and sliding crank shaft sleeve 38 with bore 39 onto shaft 32 (step 58). Connection between crank 30 and shaft 32 can be press-fit, splined or pinned depending on system requirements. While steps are shown in this order, they may be performed in a different order and may include interim steps depending on system requirements.

In summary, adding stiffening ribs 44, 46 to crank 30 and the design of a single connection at pin bore 41 of crank 30 to link 26 makes crank 30 more robust with increased natural frequency, allowing it to reduce susceptibility to vibration. The increase in natural frequency and reduced susceptibility to vibrations results in less wear on crank 30 and overall linkage system 16, particularly in the connection between link 26 and crank 30. This can improve life of linkage system 16 and overall pneumatic air valve 10.

While crank 30 has been shown in the embodiments above to include ribs 44, 46 above and below supporting member 42, it can have ribs only above or only below supporting member. The ribs can also take different shapes and/or sizes than those shown in FIGS. 2A-2C.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A valve linkage system comprising:
a pin sleeve having a pin bore for receiving a connecting pin to connect a crank to a link in the valve linkage system, wherein a connection between the crank and the link consists of one side of the crank interfacing with one side of the link such that there is a single connection at the pin bore of the crank to the link;
an integral locking insert inside the pin bore;
a shaft sleeve having a bore for receiving a shaft;
an arm between the pin bore and shaft sleeve; and
a first stiffening rib extending from the shaft sleeve toward the pin bore.

2. The system of claim 1, and further comprising:
a second stiffening rib extending from the shaft sleeve toward the pin bore.

3. The system of claim 1, wherein the first stiffening rib is located above the arm and the second stiffening rib is located below the arm.

4. The system of claim 1, wherein the first stiffening rib is located above the arm.

5. The system of claim 1, wherein the integral locking insert comprises:
a helical insert to hold a bolt connecting the crank to the link.

6. A linkage system for connecting a pneumatic actuation system to an air valve having a valve body connected to a rotatable shaft, the linkage system comprising:
a clevis for connecting to the actuation system to be moved by the actuation system;
a crank with a pin sleeve having a pin bore for receiving a connecting pin, a shaft sleeve having a bore for receiving the rotatable shaft, an arm between the pin bore and shaft sleeve and a first stiffening rib extending from the shaft sleeve toward the pin bore; and
a link with a pin bore on one end for receiving the connecting pin and connecting to the clevis on an opposite end to move with the clevis and to move the crank,
wherein a connection between the link and the crank consists of one side of the crank interfacing with one side of the link such that there is a single connection at the pin bore of the crank to the link, and wherein the pin bore includes a helical locking insert.

7. The linkage system of claim 6, wherein the connecting pin is a bolt and the connection includes a bushing.

8. The linkage system of claim 6, wherein the crank further comprises a second stiffening rib.

9. The linkage system of claim 8, wherein the first stiffening rib is located above the arm and the second stiffening rib is located below the arm.

10. The linkage system of claim 6, wherein the first stiffening rib is located above the arm.

11. A pneumatic air valve comprising:
a pneumatic actuation system;
a rotatable shaft;
a rotatable valve body connected to the rotatable shaft; and
a linkage system connecting the actuation system to the valve body, wherein the linkage system comprises a clevis for connecting to the actuation system to be moved by the actuation system; a crank with a pin sleeve having a pin bore for receiving a connecting pin, a shaft sleeve having a bore for receiving the rotatable shaft, an arm between the pin bore and shaft sleeve and a first stiffening rib extending from the shaft sleeve toward the pin bore; and a link with a pin bore on one end for receiving the connecting pin and connecting to the clevis on an opposite end to move with the clevis and to move the crank,
wherein a connection between the link and the crank consists of one side of the crank interfacing with one side of the link such that there is a single connection at the pin bore of the crank to the link, and wherein the pin bore includes a helical locking insert.

12. The valve of claim 11, wherein the connecting pin is a bolt.

13. The valve of claim 11, wherein the crank further comprises a second stiffening rib.

14. The valve of claim 11, wherein the first stiffening rib is located above the arm and the second stiffening rib is located below the arm.

15. The valve of claim 11, wherein the first stiffening rib is located above the arm.

16. The valve of claim 11, wherein the actuation system comprises a plurality of pistons in cylinders.

17. The valve of claim 11, wherein the valve is a butterfly valve.

18. A method of installing a crank in a linkage system, the method comprising:
aligning the pin bores of one side of a crank and one side of a link, wherein the crank comprises a pin sleeve having a pin bore for receiving a connecting pin, a shaft sleeve having a bore for receiving the rotatable shaft, an arm between the pin bore and shaft sleeve and a first stiffening rib extending from the shaft sleeve toward the pin bore;
inserting bushing into the link pin bore;
inserting and torqueing a bolt into the pin bores to connect the crank to the link, wherein the pin bore includes a helical locking insert and wherein a connection between the crank and the link consists of the one side of the crank interfacing with the one side of the link such that there is a single connection at the pin bores of the crank to the link; and
sliding the bore of the crank shaft sleeve onto a rotatable shaft connected to a valve body.

\* \* \* \* \*